United States Patent
Yoon (10) Patent No.: US 7,292,935 B2
(45) Date of Patent: Nov. 6, 2007

(54) APPARATUS AND METHOD FOR GUIDING LOCATION OF THE OTHER PARTY IN NAVIGATION SYSTEM

(75) Inventor: Chang Kyoung Yoon, Goori-si (KR)

(73) Assignee: LG Electronics Inc., Seoul (KR)

( * ) Notice: Subject to any disclaimer, the term of this patent is extended or adjusted under 35 U.S.C. 154(b) by 268 days.

(21) Appl. No.: 10/775,226

(22) Filed: Feb. 11, 2004

(65) Prior Publication Data

US 2004/0158401 A1    Aug. 12, 2004

(30) Foreign Application Priority Data

Feb. 12, 2003    (KR) .............. 10-2003-0008919

(51) Int. Cl.
*G01C 21/00* (2006.01)

(52) U.S. Cl. .............. 701/209; 701/200; 701/300; 701/207; 701/213; 701/214; 340/988; 340/991; 340/992; 340/993; 342/357.07

(58) Field of Classification Search ............... 701/200, 701/207, 209, 213, 214, 300; 340/988, 991, 340/992, 993; 342/357.01, 357.07, 357.09
See application file for complete search history.

(56) References Cited

U.S. PATENT DOCUMENTS

| | | | | |
|---|---|---|---|---|
| 5,450,329 A | * | 9/1995 | Tanner | 701/213 |
| 6,226,589 B1 | * | 5/2001 | Maeda et al. | 701/207 |
| 6,240,363 B1 | * | 5/2001 | Theimer et al. | 701/210 |
| 6,424,910 B1 | * | 7/2002 | Ohler et al. | 701/202 |
| 6,441,752 B1 | * | 8/2002 | Fomukong | 340/988 |
| 6,549,768 B1 | * | 4/2003 | Fraccaroli | 455/456.3 |
| 6,838,998 B1 | * | 1/2005 | Brown et al. | 340/825.49 |
| 6,868,333 B2 | * | 3/2005 | Melen | 701/200 |
| 6,999,779 B1 | | 2/2006 | Hashimoto | |
| 2003/0195008 A1 | * | 10/2003 | Mohi et al. | 455/456.5 |

FOREIGN PATENT DOCUMENTS

| | | |
|---|---|---|
| CN | 1190183 | 8/1998 |
| CN | 1389709 A | 1/2003 |

\* cited by examiner

*Primary Examiner*—Thomas Black
*Assistant Examiner*—Marie A Weiskopf
(74) *Attorney, Agent, or Firm*—Birch, Stewart, Kolasch & Birch, LLP (57) ABSTRACT

There is provided an apparatus and method capable of providing location information of the other party's moving object in a form of map information. The method for guiding the location of the other party's moving object in the navigation system includes the steps of: selecting an identification information of the other party's navigation system in a user's navigation system, and transmitting a location information request message on the other party's moving object; receiving the location information request message of the other party's moving object at a traffic information center, tracking a location information of the other party's moving object, and transmitting the tracked location information message of the other party's moving object; and receiving the location information message of the other party's moving object at the user's navigation system, matching the location of the other party's moving object with a map information, and display the matched information.

23 Claims, 8 Drawing Sheets

APPARATUS AND METHOD FOR GUIDING LOCATION OF THE OTHER PARTY IN NAVIGATION SYSTEM

This Nonprovisional application claims priority under 35 U.S.C. § 119(a) on Patent Application No(s). 10-2003-0008919 filed in KOREA on Feb. 12, 2003, the entire contents of which are hereby incorporated by reference.

BACKGROUND OF THE INVENTION

1. Field of the Invention

The present invention relates to a navigation system, and more particularly, to an apparatus and method for guiding a location of the other party in a navigation system, in which location information of the other party's moving object is provided. In addition, the present invention relates to an apparatus and method for providing traffic information in a navigation system, in which a variety of variable information generated on a traveling route of a moving object is received from a traffic information center.

2. Description of the Related Art

In general, a navigation system displays a current location of a moving object on a map, which is displayed on a screen, by using information received from a global positioning system (hereinafter, referred to as a "GPS").

Additionally, the navigation system provides a driver with a variety of information necessary for a traveling of the moving object, such as a traveling direction of the moving object, a distance to the desired destination, a current traveling velocity of the moving object, a route that is previously set by a driver, an optimum route to the destination, and the like.

The navigation system (or GPS) is installed in various kinds of moving objects, such as vessels, airplanes and automobiles, and is widely used to check a current location and traveling velocity of the moving object or to determine a traveling route of the moving object. Specifically, the navigation system receives radio waves indicating latitude, longitude and altitude from a plurality of GPS satellites, performs a calculation operation, and visually or audibly informs the driver of a map information including the current location of the moving object.

Figure 1:
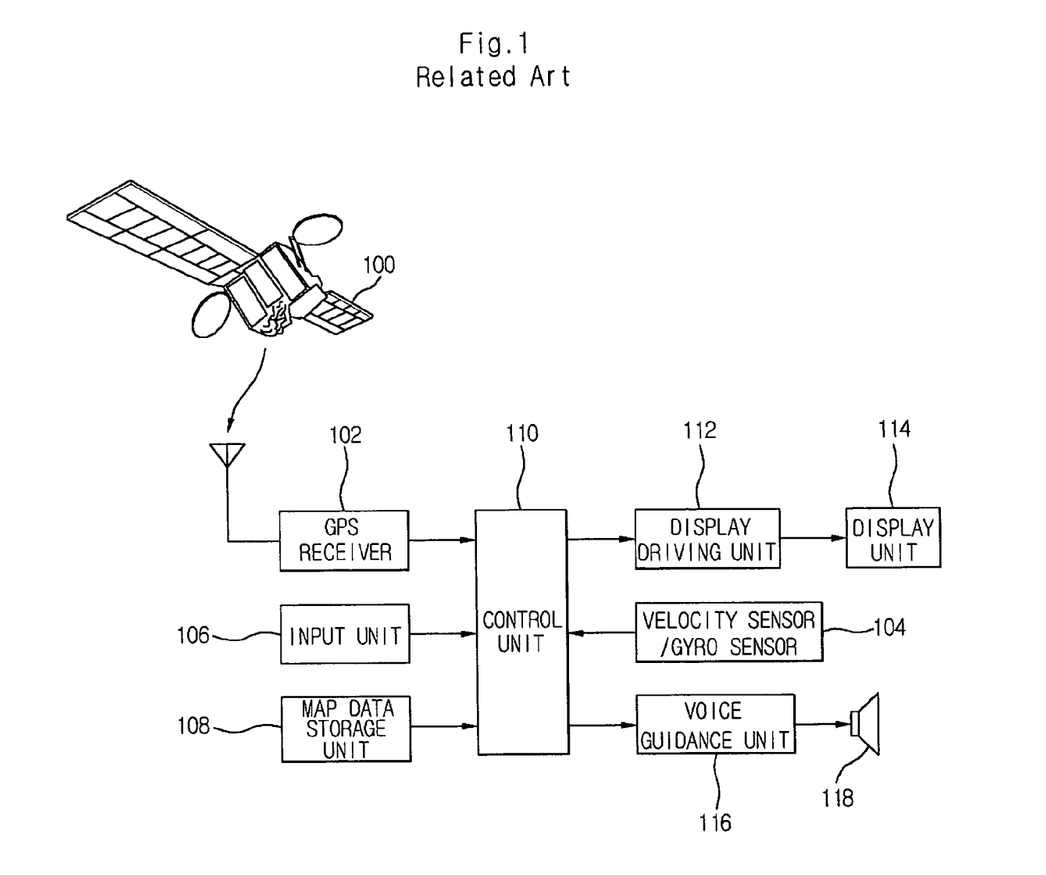
FIG. 1 illustrates a construction of a conventional navigation system.

FIG. 1 is a construction of a conventional navigation system.

Referring to FIG. 1, a GPS receiver 102 receives predetermined location data through an antenna for the purpose of a navigation service. Here, the location data are transmitted from a plurality of GPS satellites 100. A velocity sensor/gyro sensor 104 constitutes a sensor part and senses a rotational angle and velocity of a moving object.

An input unit 106 is a user interface configured to receive various key signals from a user or to allow the user to set a traveling route therethrough.

A map data storage unit 108 stores map data and other additional information data. In general, the map data storage unit 108 is implemented with compact disk-read only memory (CD-ROM).

A control unit 110 controls an overall operation of the navigation system. The control unit 110 determines a current location of the moving object by using a reception signal of the GPS receiver 102 and matches the determined current location with the map data stored in the map data storage unit 108.

In case the user inputs an origin and a destination through the input unit 106, the control unit 110 searches a traveling route from the current location of the moving object to the destination by referring to the map data stored in the map data storage unit 108. The searched traveling route is displayed on an electronic map of a display unit 114 through a display driving unit 112.

Additionally, the traveling route of the moving object can be guided by a guidance voice that is outputted to a speaker 118 through a voice guidance unit 116.

The navigation system receives GPS satellite signals from the plurality of GPS satellites 100 located over the earth and checks the current location and the traveling direction of the moving object to thereby track a traveling trace. Additionally, the navigation system provides the driver with the shortest route among several traveling routes from the origin to the destination.

Meanwhile, the conventional navigation system collects registration information of the moving objects traversing an arbitrary area, analyzes a traffic condition, and provides the analysis result of the traffic condition to the moving objects if it is requested. Accordingly, it is possible to cope with the traffic condition of a road where the user intends to travel, thereby providing a smooth traffic flow.

However, although there exist many variables, such as movement and stoppage, which change in real time on the traveling route of the moving object, there has been no method for collecting information on the variables in the traffic information center. Accordingly, there is a problem in that the conventional navigation system cannot provide accurately a service about the causes of the variables.

In addition, since the traffic information service is provided in a state that the variables according to the traveling of the moving object are not applied, the reliability of the service is lowered in the user's place, thereby degrading the convenience and reliability of the product.

In other words, according to the conventional navigation system, it is difficult to guide the traveling route while reflecting the road traffic condition that changes in real time. Additionally, it is difficult to modify a dynamic map data according to changes of the road that is opened newly or under construction.

SUMMARY OF THE INVENTION

Accordingly, the present invention is directed to an apparatus and method for guiding a location of the other party in a navigation system that substantially obviates one or more problems due to limitations and disadvantages of the related art.

It is an object of the present invention to provide an apparatus and method for guiding a location of the other party in a navigation system, in which location information of the other party's moving object is provided.

It is another object of the present invention to provide an apparatus and method for guiding a location of the other party in a navigation system, in which the navigation system requests a location information of the other party's moving object to a traffic information center by using identification information of the other party's moving object, and the other party's location information received from the traffic information center is displayed on one's own display unit.

It is another object of the present invention to provide an apparatus and method for guiding a location of the other party in a navigation system, in which locations of the other parties as well as location information services with respect to a plurality of moving objects are provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an embodiment of the present invention, an apparatus for guiding a location of the other party in a navigation system includes: a GPS receiver for receiving location data from a plurality of GPS satellites; a storage unit for storing a map data; a display unit for displaying the stored map data and location information of the other party on a screen; a voice processing unit for processing a voice signal and outputting the processed voice signal; an input unit for inputting a variety of key signals and requesting a location information of the other party's moving object; a wireless communication unit for requesting the location information of the other party's moving object to a traffic information center and receiving the request result; and a control unit for controlling each unit, controlling a location information message of the other party's moving object to be transmitted to the wireless communication unit, and controlling the location information of the other party's moving object to be displayed from the received location information message.

According to another embodiment of the present invention, a method for guiding a location of the other party's moving object in a navigation system includes the steps of: selecting an identification information of the other party's navigation system in a user's navigation system, and transmitting a location information request message on the other party's moving object; receiving the location information request message of the other party's moving object at a traffic information center, tracking a location information of the other party's moving object, and transmitting the tracked location information message of the other party's moving object; and receiving the location information message of the other party's moving object at the user's navigation system, matching the location of the other party's moving object with a map information, and displaying the matched information.

According to another embodiment of the present invention, a method for guiding a location of the other party's moving object in a navigation system includes the steps of: selecting respective identification information of the other party's navigation systems in a user's navigation system, and transmitting location information request messages on the other party's moving objects; receiving the location information request messages of the other party's moving objects at a traffic information center, tracking location information of the other party's moving objects, and transmitting the tracked location information messages of the other party's moving objects; and receiving the location information messages of the other party's moving objects at the user's navigation system, matching the locations of the other party's moving objects with a map information, and displaying the matched information.

The navigation system of the present invention can display the location information on the other party's moving objects, whose location information is shared, on one's own map information. In addition, since it is possible to update the location information of the other party in real time, the navigation system of the present invention can provide the high-quality service.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Reference will now be made in detail to preferred embodiments of the present invention with reference to the attached drawings.

Figure 2:
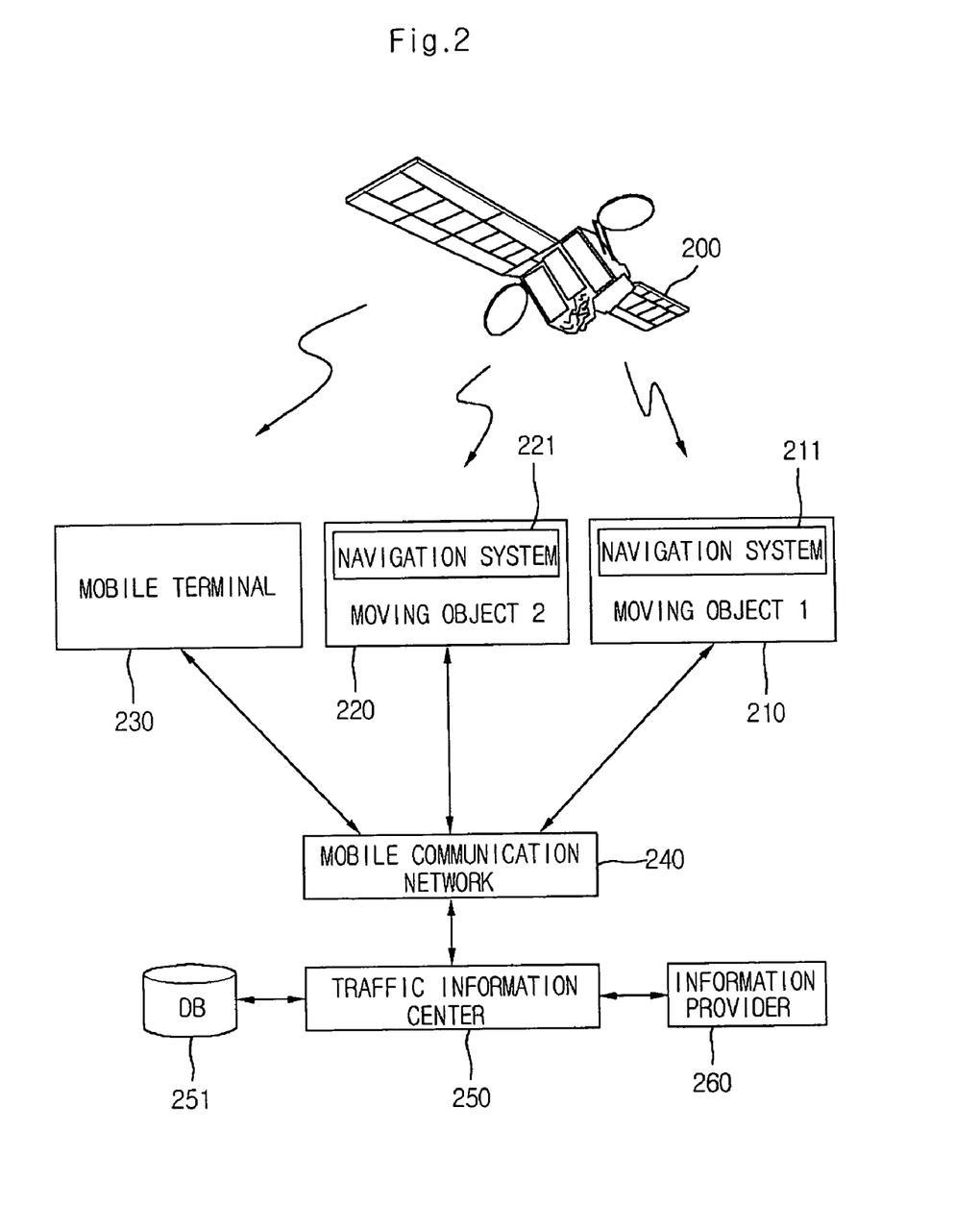
FIG. 2 illustrates a service network of a navigation system according to an embodiment of the present invention.

As shown in FIG. 2, a navigation system according to the present invention includes: navigation systems 211 and 221 installed respectively in moving objects 210 and 220 to search a traveling route by using a location data received from a plurality of GPS satellites 200 and a map data stored in a storage media, and to display the traveling route on a screen; a mobile terminal 230; a mobile communication network 240 for enabling a wireless communication between the navigation systems 211 and 221 and the mobile terminal 230; a traffic information center 250 including a database 251, for providing traffic information and location information to the navigation systems 211 and 221; and an information provider 260 for providing various kinds of information requested by the traffic information center 250.

Herein, an operation of the navigation system constructed as above will be described below.

Referring to FIG. 2, the navigation systems 211 and 221 are installed in the moving objects 210 and 220 and detects the current locations of the moving objects 210 and 220 by using the location data received from the plurality of GPS satellites 200 and signals sensed by a plurality of sensors, such as a gyro sensor for sensing a traveling direction of the moving object and a velocity sensor for sensing a traveling velocity of the moving object.

The navigation systems 211 and 221 map-match the detected current locations of the moving objects 210 and 220 with the map data stored in the storage medium and search a traveling route from the current location to the destination by using the map data. Additionally, the navigation systems 211 and 221 have functions of searching and guiding the optimum route, which allow the moving objects to travel to the destinations along the searched traveling route.

Further, the navigation systems 211 and 221 request service information, such as real-time traffic information, route guidance information and telephone connection, to the traffic information center 250 through the mobile communication network 240. Additionally, the navigation systems 211 and 221 receive traffic information service from the traffic information center 250 through the mobile communication network 240.

Here, the mobile communication network 240 is a communication network including a base station system, a switching center, and the like. The base station system registers locations of wireless communication equipments existing in control areas under a control of an upper control station, and enables a wireless communication with wireless communication equipments, such as a navigation system and a terminal.

The traffic information center 250 provides traffic information or a variety of traffic conditions requested by the navigation systems 211 and 221 of the moving objects 210 and 220 in real time.

For this, the traffic information center 250 matches and stores identification information of the users (e.g., of the terminal 230 and the moving objects 220 and 210), whose location information is shared, in the database 251. Here, the identification information can include vehicle information, personal information, telephone number and serial number of mobile terminals. At this time, in case the location information request is received, the telephone number and serial number matched with the identification information of the other party's moving object are searched and the location information is provided from a base station (a cell controller) which manages the corresponding telephone number and serial number. Then, the location information is transmitted to the moving object that requests the information.

The information provider 260 provides geographical information, traffic information, and a variety of Internet information to the traffic information center 250.

Meanwhile, the user requests the location information of the other party's moving object to the traffic information center 250 and receives the corresponding response message, so that the location of the other party's moving object is displayed on the map information of the user's own navigation system. Here, the other party's moving object includes a navigation system installed therein and/or a mobile terminal carried by its user.

In other words, the location information service can be used variously according to loss prevention, burglarproof, business purpose and personal purpose by users of mobile communication equipments or forwarding agents. At this time, information of users, whose personal location information is shared, must be registered in the traffic information center 250.

If the user of the first moving object 210 wants to check the location information of the second moving object 220 through the user's navigation system 211, the navigation system 211 requests the location information of the second moving object 220 to the traffic information center 250 through the mobile communication network 240 based on the specific identification information of the navigation system 221 installed in the second moving object 220.

At this time, the traffic information center 250 searches the specific identification information of the navigation system 221 installed in the second moving object 220 from the location information request message requested by the user of the first moving object 210, and checks whether or not the identification information of the navigation systems 211 and 221 is registered. Then, the traffic information center 250 determines the location information service.

Here, in case the information is not registered, the traffic information center 250 may not provide any information with respect to the location information request of a specific person in order to prevent a revelation of personal information. In this case, a message of "no service" with respect to the location information request message is transmitted to the corresponding moving object.

The traffic information center 250 searches the navigation system 221 of the second moving object 220 currently registered in the mobile communication network 240 and tracks the location information of the second moving object 220. Then, the traffic information center 250 temporarily stores the tracked location information of the second moving object 220 in the database 251.

Thereafter, the traffic information center 250 transmits the location information of the second moving object 220 to the navigation system 211 of the first moving object 210 through the mobile communication network 240, and the navigation system 211 of the first moving object 210 displays the received location information of the second moving object 220 on a map information of the screen of the first moving object 210.

Figure 3:
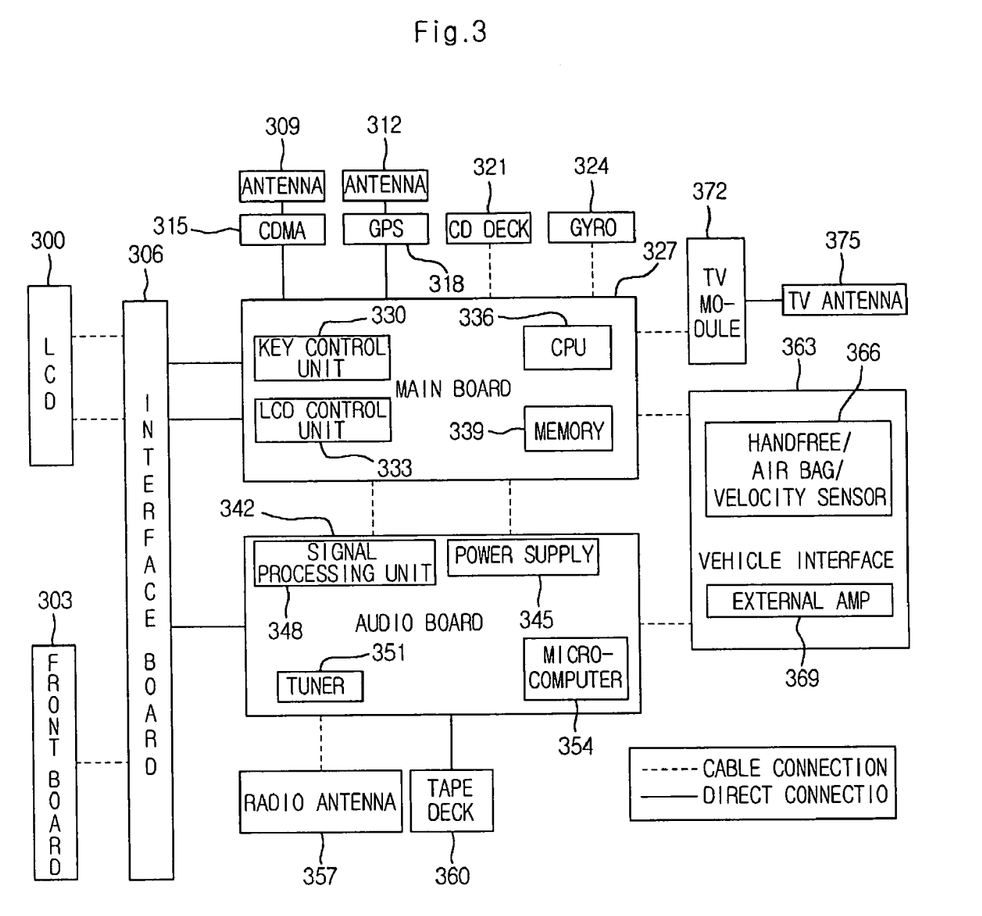
FIG. 3 illustrates a detailed construction of a navigation system according to an embodiment of the present invention.

FIG. 3 is a block diagram of the navigation system according to the present invention.

Referring to FIG. 3, the navigation system includes an interface board 306, a main board 327, an audio board 342 for processing an audio signal, and a vehicle interface 363.

The interface board 306 is connected between the main board 327 and an LCD 300 and between the audio board 342 and a front board 303 to perform an interface function.

The main board 327 includes a central processing unit (CPU) 336 for controlling the system, a memory 339 provided for storing the map information which is necessary to display the information and the traveling route guidance on the map according to the current traffic condition of a road where the moving object travels; a key control unit 330 for controlling a key signal; and an LCD control unit 333 for controlling a display operation of LCD.

The main board 327 is connected via cable or directly to a CDMA communication unit 315, a GPS receiver 318 for receiving GPS signals, a CD deck 321 for reproducing and recording disk (CD, DVD, etc.) signals, and a gyro 324. Here, the CDMA communication unit 315 is a mobile communication terminal having an equipment identification number. The CDMA communication unit 315 and the GPS receiver 318 receive signals through antennas 309 and 312, respectively.

Additionally, a TV module 372 is connected to the main board 327 to receive TV signals through a TV antenna 375. The LCD 300 and the front board 303 are connected to the main board through the interface board 306. The LCD 300 and the front board 303 are controlled by the LCD control unit 333 and the key control unit 330, respectively.

The LCD 300 functions to display a variety of video and character signals. The front board 303 includes various buttons and provides a corresponding key signal of a selected button to the main board. The front board 303 includes a menu key or button for directly inputting the traffic information according to an embodiment of the present invention.

The audio board 342 interfaces with the main board 327 and includes a microcomputer 354, a tuner 351 for receiving a radio signal, a power supply 345, and a signal processing unit 348 for performing a signal process to output a variety of audio signals.

Additionally, a radio antenna 357 for receiving the radio signal, a tape deck 360 for reproducing an audio tape, and an amp 369 for outputting the processed audio signal are connected to the audio board 342. The audio board 342 is connected to the interface board 306.

The vehicle interface 363 is an interface for transmitting/receiving signals to/from the amp 369 and hand-free/air bag/velocity sensor 366, which are mounted on the moving object, and transmits/receives signals to/from the audio board 342 and the main board 327. The velocity sensor for sensing the velocity of the moving object, the air bag for securing a safety, and the hand-free unit (366) for inputting an audio signal without using the driver's own hands are connected to the vehicle interface 363. The velocity sensor provides the velocity information to the central processing unit 326 in order to sense the velocity of the moving object.

The navigation system is a combination system that can provide a variety of wireless data services, a mobile communication and broadcasting reception through a connection to a variety of audio and video devices and an addition of a telematics function, as well as the navigation service of the moving object.

Here, for the purpose of the mobile communication service, the CDMA communication unit 315 transmits/receives signals to/from the mobile communication network through the antenna 309 by wireless. The received signal is transmitted to the audio board 342 under a control of the central processing unit 327 and then processed through the signal processing unit 348 of the audio board 342. Then, the processed signal is outputted through the amp 369 under a control of the microcomputer 354.

The TV signal received through the TV antenna 375 for the purpose of the TV broadcasting is processed through the TV module 372. Then, the processed TV reception signal is displayed in a form of a video signal on the LCD 300 through the interface board 306 under a control of the LCD control unit 333. Additionally, the audio signal of the TV reception signal is outputted through the audio board 342 and the amp 369.

An audio signal of the radio signal received through the tuner 351 for the purpose of the radio broadcasting and an audio signal of the audio tape received through the tape deck 360 are outputted through the audio board 342 and the amp 369. The audio signal reproduced through the deck 321 is also outputted through the amp 369, and a variety of the video signals are displayed on the display unit, i.e., the LCD 300.

Figure 4:
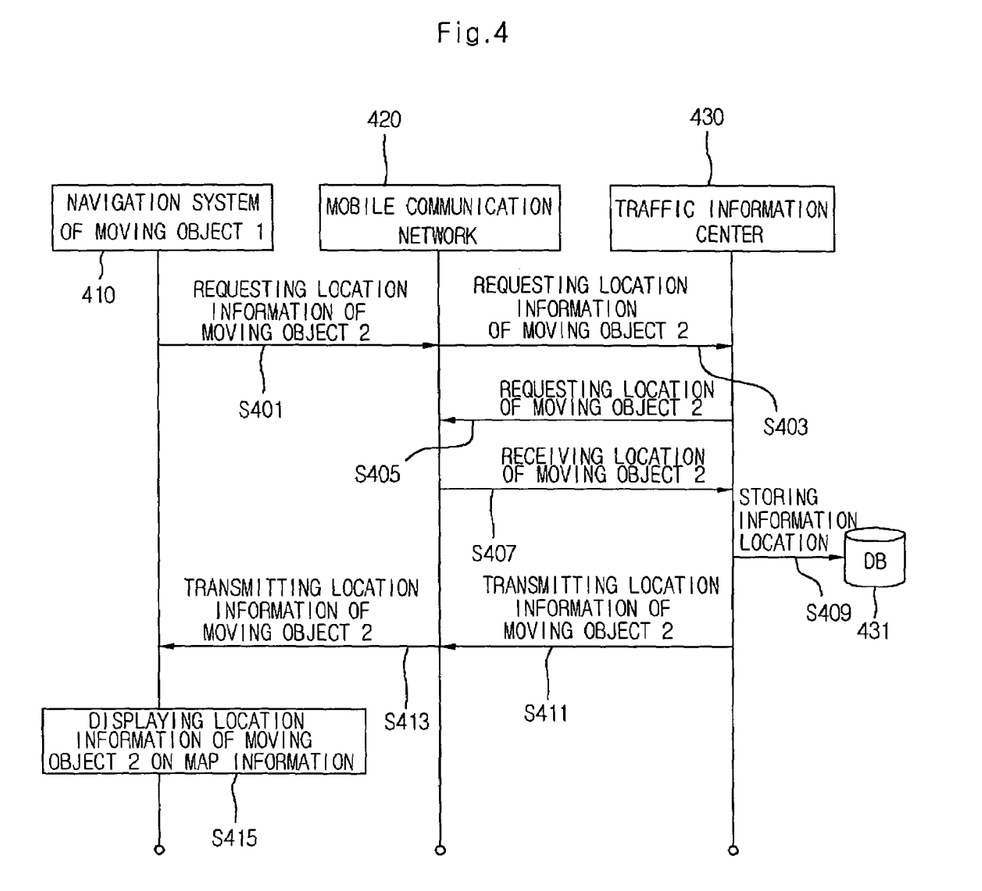
FIG. 4 is a flowchart illustrating a method for guiding a location of the other party in a navigation system according to an embodiment of the present invention.

A method for providing a location information service of other mobile communication equipment using the navigation system according to the present invention will be described with reference to FIGS. 3 and 4.

First and second moving objects register their own specific identification information and personal information in the traffic information center 430, so that location information can be shared. Here, the identification information includes telephone number and serial number of the navigation system and the mobile terminal and personal information. If necessary, vehicle number is also registered. In case the moving object uses a plurality of mobile communication equipments, i.e., a navigation system and a mobile terminal, a plurality of telephone numbers can be stored.

A user of the navigation system 410 installed in the first moving object requests a location information of the second moving object through the mobile communication network 420 by using a key signal (S401).

Here, in the step S401 of requesting the location information, the telephone number of the navigation system installed in the second moving object and the location information request signal are inputted through the front board 303, and the location information request signal inputted by the user is transmitted to the central processing unit 336 through the interface board 306. The central processing unit 336 transmits a location information request message of the first moving object to the mobile communication network 420 through the CDMA communication unit 315.

The mobile communication network 420 transmits the location information request message to the traffic information center 430 (S403). The traffic information center 430 tracks the location information of the other moving object or mobile terminal based on the registered information and then provides it to the navigation system 410 that requested the information.

In other words, the traffic information center 430 deciphers the location information request message transmitted from the navigation system 410 of the first moving object and then checks whether or not the deciphered message is registered as the location information sharing. If registered, the traffic information center 430 tracks the location information of the second moving object for the purpose of providing the location information service to the first moving object.

In order to track the location information of the second moving object, the traffic information center 430 requests the second moving object's registered location through the mobile communication network 420 and receives the location information of the second moving object (S405, S407). Here, the telephone number and serial number of the navigation system installed in the second moving object or the mobile terminal carried by the user of the moving object are used to track the location of the second moving object.

The traffic information center 430 tracks the location information of the second moving object and temporarily stores it in the database 431 (S409). Additionally, the traffic information center 430 transmits the location information of the second moving object to the navigation system 410 of the first moving object through the mobile communication network 420 (S411, S413).

The navigation system 410 of the first moving object receives the location information message of the second moving object from the traffic information center 430. Then, the navigation system 410 matches the received location information with the map information stored inside the system to display the location of the second moving object (S415). Here, the received location information of the other party is stored in the memory.

At the step S415, the map information stored in the memory 339 is read out and the received location information is displayed after matching it with the map information under a control of the LCD control unit 333. At this time, in case the information intended to be obtained from the map information stored in the memory 339 is insufficient, it is possible to request additional map information to the traffic information center 430.

The movement location can be displayed in real time by updating it according to a change in the current location of the second moving object by the user's request.

Meanwhile, in case the user requests the location information in a voice, a location information message containing an audio signal is received from the traffic information center 430. At this time, the central processing unit 336 outputs the received location information to the audio board 342. The audio board 342 processes the received location information into a voice signal through the signal processing unit 342 and outputs the voice signal to an exterior through the amp 369 under a control of the microcomputer 354. Accordingly, the user can hear the location information of the second moving object in a voice.

According to another embodiment of the present invention, in order to receive the location information service of a plurality of moving objects, the user can request the location information of a plurality of moving objects by storing the information according to specific groups and selecting the group. Also, the request can be carried out through a direct input. At this time, the traffic information center 430 checks whether or not the identification information of the moving objects are registered. If registered, the respective location information is tracked and the current location information is provided. Then, the user's navigation system displays the location information of the other party's moving objects on the map information.

Figure 5:
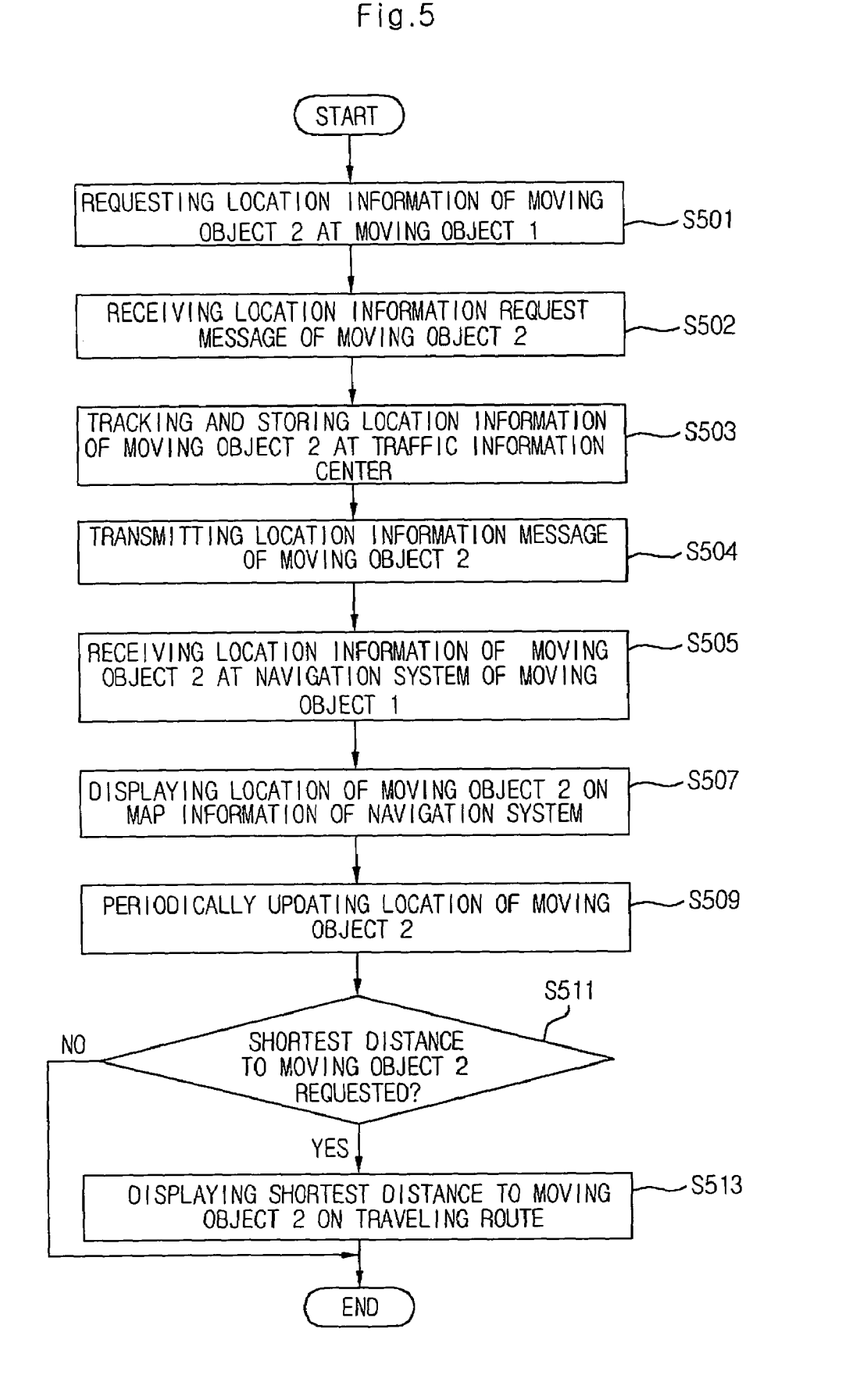
FIG. 5 is a flowchart illustrating a method for guiding a location information of the other party's moving object in a navigation system according to another embodiment of the present invention.

Hereinafter, a method for providing the location information service of the other party's object will be described in detail with reference to FIG. 5.

If the first moving object requests the location information of the second moving object (S501), the traffic information center receives the location information request message of the second moving object through the mobile communication network (S502), and tracks and stores the location information of the second moving object (S503).

Figure 8:
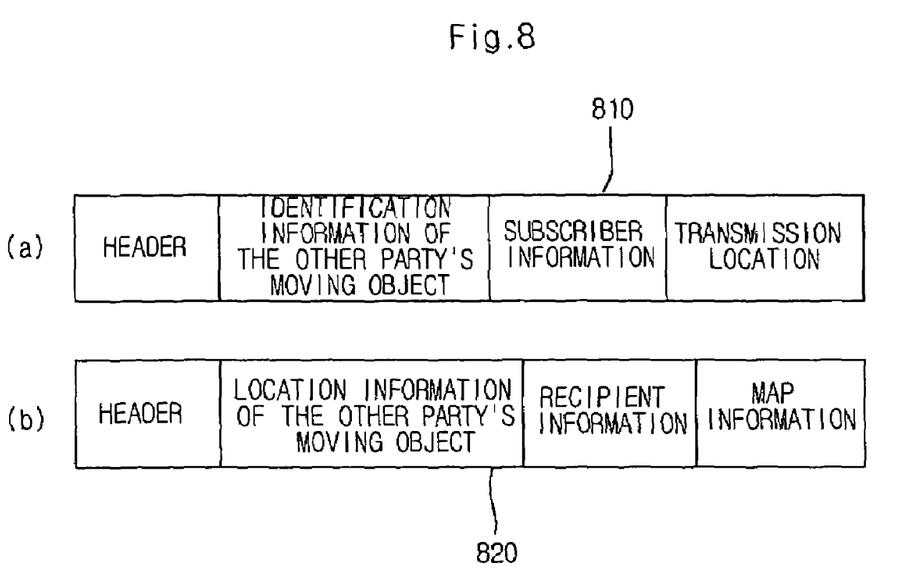
FIGS. 8(a) and 8(b) illustrate formats of a location information request message and a location information reception message in a navigation system according to an embodiment of the present invention.

Here, the location information request message is a short message service (SMS) and the SMS format is configured as shown in FIG. 8(*a*). Referring to FIG. 8(*a*), the SMS 810 includes a header information, an identification information of the other party's moving object, a subscriber information, and a transmission location. The identification information of the other party's moving object is, as an example, a telephone number of the corresponding navigation system. The subscriber information is a navigation system information of the moving object that requests the location information, and the transmission location indicates a current transmission location.

The traffic information center transmits the stored location information of the second moving object to the navigation system of the first moving object through the mobile communication network (S504). The navigation system of the first moving object receives the location information of the second moving object and then displays it on the map information (S505, S507). Additionally, while the above procedures are repeated by the user's request, the location of the second moving object is periodically updated and displayed on the map information (S509).

Here, the location information message of the second moving object is transmitted to the first moving object in a form of an SMS 820 shown in FIG. 8(*b*). Referring to FIG. 8(*b*), the SMS 820 includes a header information, a location information of the other party's moving object, a recipient information, and a map information. As an example, the location information of the other party's moving object is a coordinate indicating the latitude and the longitude. The recipient information is an identification information of the navigation system of the first moving object, and the map information is a map image having a predetermined size centering on the corresponding coordinate.

Then, in case the second moving object's location displayed on the current map information is designated as a target location and the shortest distance is requested (S511), the shortest distance to the second moving object is displayed on the traveling path (S513).

Figure 6:
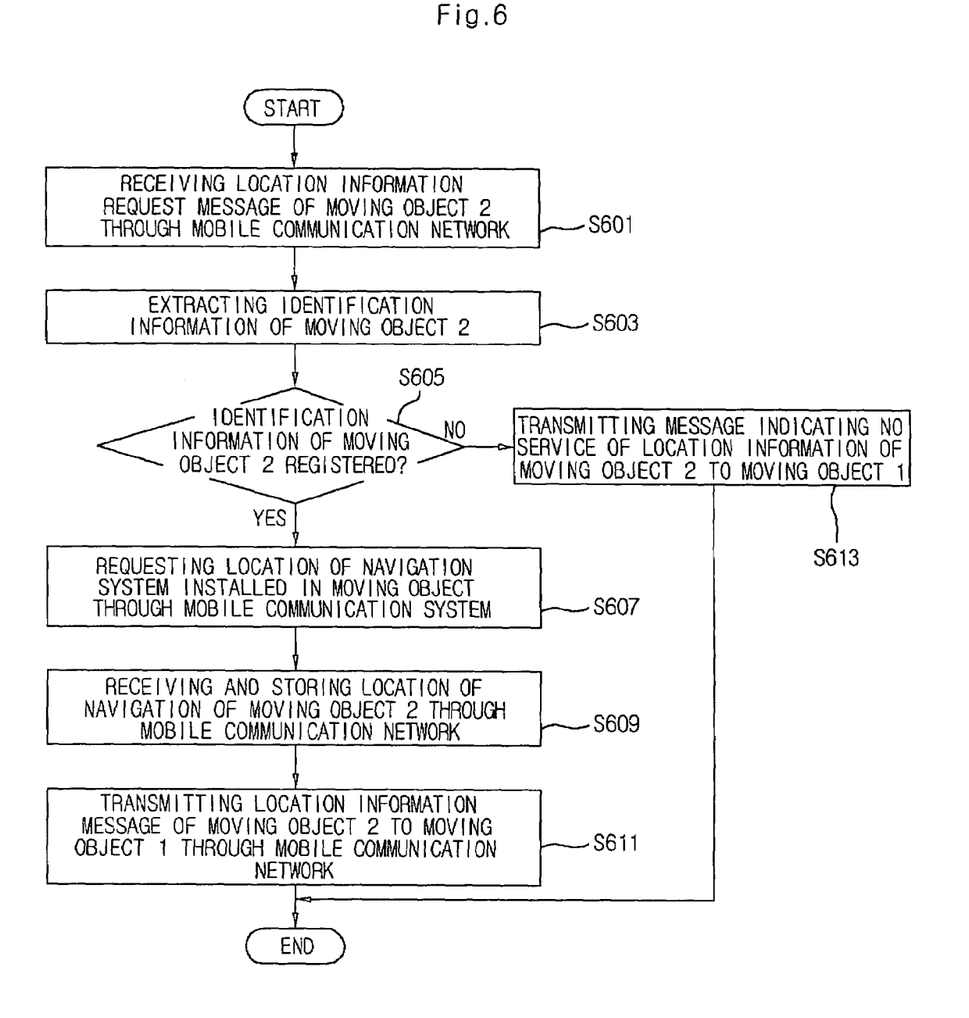
FIG. 6 is a flowchart illustrating a method for providing a location information service in a traffic information center according to an embodiment of the present invention.

FIG. 6 is a flowchart illustrating a method for providing a location information service in the traffic information center according to an embodiment of the present invention.

If the traffic information center receives the location information request message of the second moving object through the mobile communication network (S601), it detects the identification information on the navigation of the first and second moving objects (S603) and checks whether or not the identification information of the second moving object is registered as the location information sharing (S605).

As the checking result, if the identification information of the second moving object is registered as the location information sharing, the location of the second moving object is requested through the mobile communication network (S607). The location information is received and then stored in the database (S609). Here, the second moving object is a moving object having a navigation system installed therein, or a personal mobile terminal.

Then, the location information message of the second moving object is transmitted to the first moving object through the mobile communication network (S611).

As the checking result of the step S605, if the location sharing of the second moving object is not registered, a message indicating "no service" the location information is transmitted to the first moving object (S613).

Figure 7:
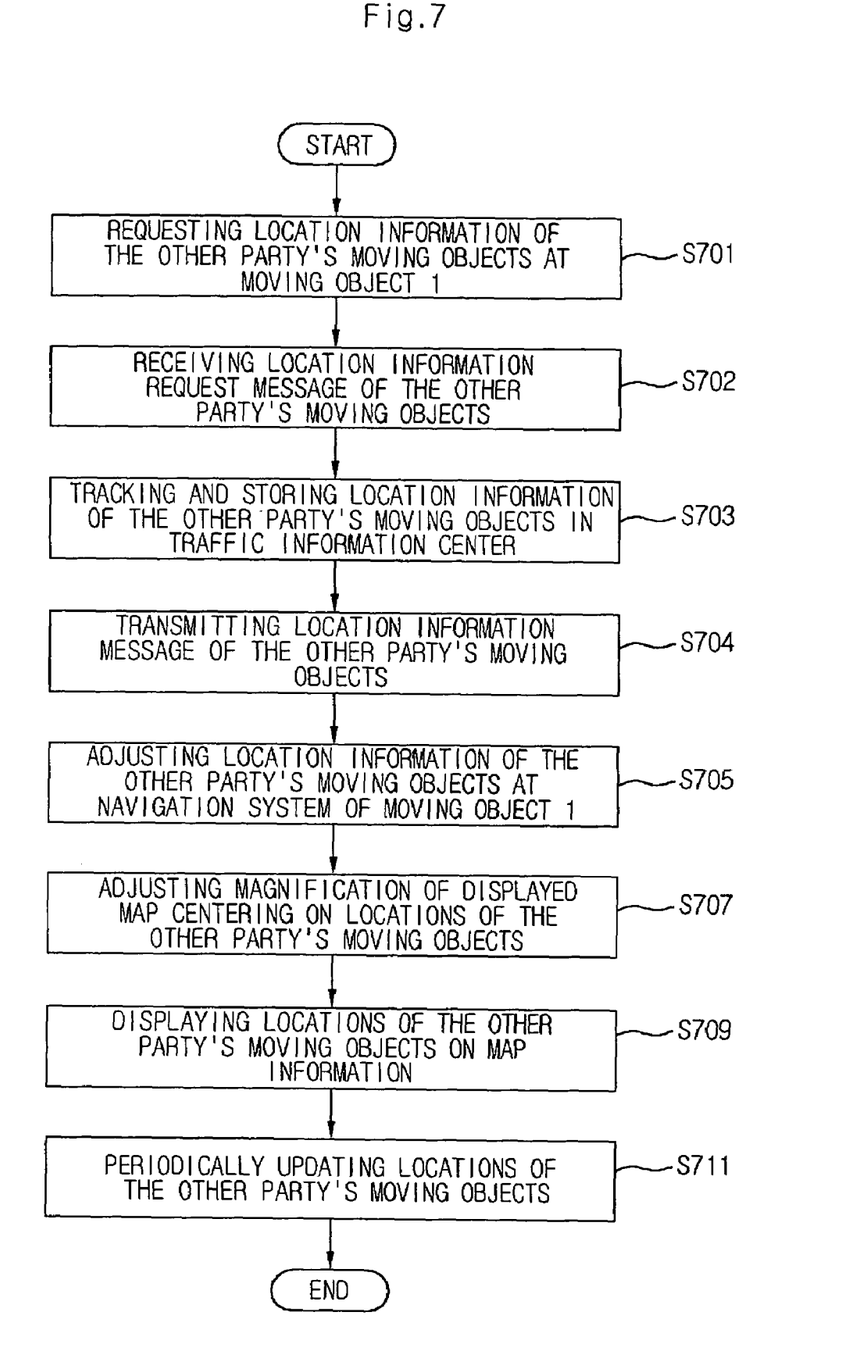
FIG. 7 is a flowchart illustrating a method for guiding locations of the other party's moving objects in a navigation system according to an embodiment of the present invention.

FIG. 7 is a flowchart illustrating a method for providing the location information service of the other party's moving objects according to the present invention.

Referring to FIG. 7, the user of the first moving object selects the identification information of the other party's moving object and transmits it over the location information request message as shown in FIG. 8(*a*) (S701). Then, all the location information of other moving objects is tracked based on the received location information and the tracked location information is stored (S703).

The traffic information center transmits the message containing the other party's moving objects to the navigation system of the first moving object through the mobile communication system (S704).

The navigation system of the first moving object receives the message containing the location information of the other party's moving objects as shown in FIG. 8(*b*) (S705) and then adjusts the magnification of the map information so that the location information of the other party's moving objects can be all displayed on one screen (S707).

After the magnification of the map information is adjusted, the navigation system matches the locations of the other party's moving objects with the map of the storage medium and displays it on the map information of the screen (S709). Then, the location information of the respective moving objects is updated (S711). At this time, all the location information is displayed on the current map information by changing the magnification of the map information according to the periodic change in the locations of the respective moving objects.

In another embodiment of the present invention, in case the user selects other moving objects' location information displayed on the screen, for example, in case the user touches a specific location information displayed on a touch screen, it can cause an automatic connection to the telephone number of the navigation system of a corresponding moving object. Therefore, the user can easily make a voice call even during a movement while watching the other party's location information displayed on the screen.

As described above, according to the present invention, a location of another user's mobile communication equipment as well as one's own location can be displayed on the map, such that current locations of other users can be checked accurately during a movement.

Further, product satisfaction can be improved through an expansion in a use range of the navigation system.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for guiding a location of the other party in a navigation system, comprising:
   a GPS receiver for receiving location data from at least one GPS satellite;
   storage means for storing map data;
   display means for displaying the stored map data and location information of the other party on a screen;
   voice processing means for processing a voice signal and outputting the processed voice signal;
   input means for inputting a variety of key signals and requesting a location information of the other party's moving object;
   wireless communication means for transmitting a location information request message requesting the location information of the other party's moving object to a traffic information center and receiving the requested location information; and
   control means for generating the location information request message pertaining to the other party's moving object to be transmitted to the wireless communication means, controlling the display means to display the received location information of the other party's moving object, receiving, from the traffic information center, the shortest distance between a location of the apparatus and a location of the other party's moving object determined according to at least traffic information of the other party's moving object, displaying the received shortest distance using the display means, receiving a selection of the other party's moving object's location information displayed on the display means, and connecting to a selected system according to the selection.

2. The apparatus according to claim 1, wherein the control means processes the location information of the other party's moving object, received from the wireless communication means, to simultaneously output the location of the other party's moving object to the display means and the voice processing means.

3. A method for guiding a location of the other party's moving object in a navigation system, comprising:
   (a) selecting an identification information of the other party's navigation system in a user's navigation system, and transmitting the identification information and a location information request message pertaining to the other party's moving object to a traffic information center;
   (b) receiving the location information request message including a tracking location information, and a traffic information of the other party's moving object at the traffic information center;
   (c) identifying the shortest distance between the user's location and the other party's location according to the tracking location information and the traffic information;
   (d) matching the location of the other party's moving object with a map information, and displaying the matched information;
   (e) displaying, on a screen of the user's navigation system, the identified shortest distance and location information of the other party's moving object;
   (f) receiving a selection of the location information of the other party's moving object displayed on the screen; and
   (g) connecting to a selected system according to the selection.

4. The method according to claim 3, wherein after the step (d), the location information of the other party's moving object is periodically updated and reflected on the currently displayed map information.

5. The method according to claim 3, wherein the step (c) includes:
   requesting a traveling route which sets the location of the other party's moving object, displayed on the map information, as a target route.

6. The method according to claim 3, wherein the location information request message includes a telephone number of the navigation system installed in the other party's moving object, a subscriber information and a transmission location.

7. The method according to claim 3, wherein the location information reception message includes a location information of the navigation system installed in the other party's moving object, a recipient information and a map information.

8. The method according to claim 3, wherein the location information request messages and a message responding thereto are short message service (SMS).

9. The method according to claim 3, wherein the step (b) includes the steps of:
   receiving the location information request message pertaining to the other party's moving object through a mobile communication network;
   extracting a telephone number of the navigation system contained in the received location information request message and checking whether or not the telephone number is registered as a location information sharing;
   if the telephone number is registered as the location information sharing, tracking the location information of the other party's navigation system through the mobile communication network and storing the tracked location information of the other party's navigation system; and
   transmitting the stored location information of the other party's navigation system through the mobile communication network to the navigation system that requested the location information.

10. A method for guiding a location of the other party's moving object in a navigation system, comprising:
    (a) selecting respective identification information of the other party's navigation systems in a user's navigation system, and transmitting the respective identification information and location information request messages pertaining to the other party's moving objects to a traffic information center;
    (b) receiving the location information request messages and traffic information of the other party's moving objects at the traffic information center;

(c) identifying the shortest distance between the user's location and each of the other party's moving object's locations according to the traffic information;

(d) displaying, at the user's navigation system, location information of the other party's moving objects according to the location information request messages, and displaying the corresponding identified shortest distance at the user's navigation system;

(e) selecting one of the location information of the other party's moving objects displayed on a screen of the user's navigation system; and (f) connecting to a selected system.

11. The method according to claim 10, wherein the location information request message includes telephone numbers of the navigation systems, information on user who requests the location information, and a current transmission location.

12. The method according to claim 10, wherein the location information reception message includes location information of the navigation systems, recipient information and map information corresponding to the location information.

13. The method according to claim 10, wherein when at least one of the location information messages is received at the traffic information center, a magnification of a current map information is adjusted in order to display all locations of the other party's moving objects contained in the at least one location information message, matching all location information of the other party's moving objects and displaying the matched information.

14. The method according to claim 13, wherein the location information of the other party's moving objects is periodically updated and the magnification of the map information is re-adjusted centering on the updated location information of the other party's moving objects.

15. A method for providing location information of a party's moving object, comprising:

transmitting, from a user's navigation system, an identification information of another party's moving object, and a location request requesting location information of the another's party's moving object;

receiving, by the user's navigation system, the requested location information of the another party's moving object as well as the shortest distance between a location of the user's navigation system and a location of the another party's moving object that is determined according to traffic information of the another party's moving object;

selecting the location information of the another party's moving object displayed on a screen of the user's navigation system; and connecting to a selected system.

16. The apparatus according to claim 1, wherein the apparatus is provided in a moving object.

17. The method according to claim 3, wherein in the identifying step (c), the identified shortest distance is a shortest distance between the user's moving object's location and the other party's moving object's location, which has been identified according to the tracking location information and the traffic information.

18. The method according to claim 10, wherein in the identifying step (c), the identified shortest distance is a shortest distance between the user's moving object's location and each of the other party's moving object's locations, which has been identified according to the traffic information.

19. The method according to claim 15, wherein the user's navigation system is provided in a moving object.

20. A method for guiding a location of the other party's moving object in a system, comprising:

(a) selecting an identification information of the other party's system in a user's system, and transmitting the identification information and a location information request message pertaining to the other party's moving object to a traffic information center;

(b) receiving the location information request message including at least one of a tracking location information and a traffic information of the other party's moving object at the traffic information center;

(c) receiving the information message of the other party's moving object at the user's system;

(d) matching the location of the other party's moving object with a map information, and displaying the matched information on a screen of the user's system;

(e) selecting the other party's moving object's location information or the other party's moving object displayed on the screen; and (f) connecting to a selected system.

21. The method according to claim 20, wherein the connecting to the selected system is performed as using the other party's moving object's identification information.

22. An apparatus for guiding a location of the other party's moving object in a system, comprising:

means for selecting an identification information of the other party's system in a user's system, and transmitting the identification information and a location information request message pertaining to the other party's moving object to a traffic information center, wherein the location information request message including at least one of a tracking location information and a traffic information of the other party's moving object is received at the traffic information center;

means for receiving the information message of the other party's moving object at the user's system;

means for matching the location of the other party's moving object with a map information, and displaying the matched information on a screen of the user's system;

means for selecting the other party's moving object's location information or the other party's moving object displayed on the screen; and means for connecting to a selected system.

23. The apparatus according to claim 22, wherein the connecting to the selected system is performed using the other party's moving object's identification information.

* * * * *